United States Patent [19]

Flautt et al.

[11] Patent Number: 5,116,900
[45] Date of Patent: May 26, 1992

[54] COATING COMPOSITION FOR FIBERS

[75] Inventors: Martin C. Flautt, Granville; Leonard J. Adzima, Pickerington, both of Ohio

[73] Assignee: Owens-Corning Fiberglas Corporation, Toledo, Ohio

[21] Appl. No.: 479,566

[22] Filed: Feb. 13, 1990

[51] Int. Cl.⁵ .............................. C08J 3/03; C08K 5/06; C08G 64/00; C08L 69/00
[52] U.S. Cl. .................................... 524/377; 524/874; 524/876; 524/281; 524/729; 524/503; 528/196; 528/203; 528/204
[58] Field of Search ............... 524/874, 876, 281, 377, 524/729, 503; 528/196, 203, 204

[56] References Cited

U.S. PATENT DOCUMENTS

| | | |
|---|---|---|
| 3,042,544 | 7/1962 | Marzocchi et al. |
| 3,436,278 | 4/1969 | Poliak |
| 4,283,322 | 8/1981 | Temple |
| 4,330,337 | 5/1982 | Graham |
| 4,369,264 | 1/1983 | Baumann et al. |
| 4,439,558 | 3/1984 | Tamosauskas et al. |
| 4,539,364 | 9/1985 | Pollet et al. |
| 4,605,731 | 8/1986 | Evans et al. |
| 4,608,304 | 8/1986 | Rosthauser |
| 4,609,591 | 9/1986 | Pollet et al. |
| 4,642,265 | 2/1987 | Suzuki |
| 4,644,053 | 2/1987 | Brunelle et al. |
| 4,645,297 | 2/1987 | Yoshihara et al. |
| 4,663,231 | 5/1987 | Girgis |
| 4,702,554 | 10/1987 | Takahashi et al. |
| 4,710,406 | 12/1987 | Fugier et al. |
| 4,738,509 | 4/1988 | Broer et al. |
| 4,740,583 | 4/1988 | Brunelle et al. |
| 4,759,985 | 7/1988 | Armiger et al. |
| 4,764,427 | 8/1988 | Hara et al. |
| 4,795,678 | 1/1987 | Girgis |
| 4,921,658 | 5/1990 | Pennington et al. |

OTHER PUBLICATIONS

Mikhail M. Girgis and Robert A. McLaughlin, Jr., "Impregnated Fiber Glass Yarns for Reinforcing Industrial Coated Fabrics", Sep. 27-28, 1988, N.Y., No. PD 296-06.

Primary Examiner—Paul R. Michl
Assistant Examiner—Patrick Niland
Attorney, Agent, or Firm—Patrick P. Pacella; Ted C. Gillespie; Catherine B. Martineau

[57] ABSTRACT

An aqueous coating composition for glass fibers is provided which contains a polycarbonate precursor material and a water soluble film former or binder. The resulting coated glass fibers have excellent flexibilty with little or no powdering of the coating composition off the fibers.

6 Claims, No Drawings

COATING COMPOSITION FOR FIBERS

The present invention relates to a coating compositions for fibers. In particular, the coating compositions are intended for coating flexible strands of glass fibers for use in structural composites.

BACKGROUND OF THE INVENTION

The use of various thermosetting and thermoplastic compounds to produce molding compositions is well known. In particular one such composition, a polycarbonate precursor, known as Lexan® RMP available from General Electric has desirable properties which causes it to act like both a thermoplastic resin and a thermosetting resin. However, problems have been encountered in trying to produce a coated fiber glass strand or roving having a sufficiently high final solids content on the strand or roving, while still having a flexible roving with little or no loss of the polycarbonate precursor due to powdering of the polycarbonate precursor material from the roving.

It has surprisingly been discovered that the problems associated with these known coating compositions may be overcome by using a water soluble polymer or a binder. It has also been surprisingly discovered that a aqueous coating composition comprising this water soluble polymer, the polycarbonate precursor material, and other ingredients such as viscosity modifiers, dispersants, defoamants, catalysts and the like, can be formulated which then allows one to take advantage of the thermoplastic/thermosetting characteristics of the Lexan® RMP polycarbonate precursor material.

SUMMARY

The present invention is directed to a coating composition which provides a high final solids content of polycarbonate precursor Lexan RMP® polymer, a proprietary material developing by and available from the General Electric Company, on a glass fiber strand or roving.

In one aspect of the present invention, there is provided an aqueous coating composition comprising the polycarbonate precursor material, a water soluble polymer film former, a thickener or viscosity modifier, a dispersant, a defoamant, a catalyst, and the balance being water.

The use of the water soluble polymer film former enables one to apply the GE Lexan® RMP powder to and remain adhered to glass fibers. The resulting coated glass fibers can be fabricated to provide a glass-fiber reinforced product. The coating composition of the present invention provides glass strand or roving having excellent flexibility with little or no powdering of the coating off from the roving.

These and other aspects and advantages of the present invention will become more clear after consideration is given to the detailed description of the invention which follows.

DETAILED DESCRIPTION OF INVENTION

The present invention is useful with any glass fiber conventionally utilized for the reinforcement of polymeric resins. The term "glass fibers" as used herein means filaments formed by attenuation of one or more streams of molten glass and to strands formed when the glass fiber filaments are gathered together in forming. The term also means yarns and cords formed by applying and/or twisting a multiplicity of strands together and to woven and non-woven fabrics which are formed of the glass fiber strands, yarns, or cords. Preferably, the size formulation of the present invention is usable with E-type fibers.

The individual components utilized in the practice of this invention are commercially available and can thus be simply blended with one another in the preparation of the formulations embodying the features of the present invention.

The coating composition of the present invention comprises a polycarbonate precursor material, a film former, a thickener or viscosity modifier, a dispersant, a defoamant material, a catalyst, the balance being water. Also according to this invention there is provided fibers at least a portion of the surface of which is coated with the coating composition of this invention.

According to a preferred embodiment, the polycarbonate precursor material used in the present invention is the Lexan® RMP material, a proprietary material from General Electric, having a common name of cyclic polycarbonate oligomers and a chemical name of poly cyclo [oxy carbonyloxy-1,4-phenylene (1-methylethylidine)-1,4-phenylene). The processing characteristics are such that the Lexan® RMP material acts in a similar manner to a thermosetting material and yet the Lexan® RMP material also posses end characteristics similar to a thermoplastic material. As the Lexan® RMP material is heated it softens at about 150° C. and at 200°-250° C. the Lexan® RMP material is fluid. At 250°-300° C., in the presence of a catalyst, the Lexan® RMP material polymerizes to form a high molecular weight thermoplastic material.

The present invention achieves a high loading of the Lexan® RMP material on glass fibers, by using a binder or film former. In a preferred embodiment, the binder or film former is a water soluble polyethylene oxide polymer, such as Polyox WSR-N-3333, for Union Carbide Corporation.

In the coating composition of the present invention, various suitable thickener or viscosity modifiers can be employed to aid in holding the parcarbonate precursor Lexan RPM® particles in suspension. One particularly suitable thickener is Drewfloc 270 which is commercially available from the Drew Chemical Corporation, a division of Ashland Chemical Company, One Drew Plaza, Boonton, N.J. 07005, which is a high molecular weight, highly charged anionic granular acrylic polymer.

The coating composition of the present invention can contain any suitable dispersant. One suitable dispersant is the TRITON X100 material available from the Rohm and Haas Company, which is an octylphenoxytllyethoxyethanol. In addition, the coating composition of the present invention can contain a defoamant material such as Nopco NTW which is commercially available from the Nopco Chemical Company Henkel Corporation, 300 Brooksvide Avenue, Ambler, Pa. 19002, which is a combination of petroleum derivatives comprising a water dispersible blend of nonionic surfactants having a hazy amber liquid appearance, a specific gravity of 0.89, a density at 20° C. of 7.45 16/gal, a viscosity of 900 cp (Brookfield), and a flash point of 175° F. (79° C.).

The coating composition also contains a suitable catalyst which aids the polymerization of the Lexan® RMP. General Electric recommends the use of either lithium salicylate or tetrabutylammonium tetraphenylborate. While both have been found to be acceptable, lithium salicylate is preferred.

The balance of the size composition of the present invention comprises water. The various ingredients of the coating composition, other than the catalyst, are preferred to be neutral acting in that they do not either accelerate or retard the polymerization rate of the Lexan ® RMP polycarbonate precursor material.

In particular, the aqueous coating composition comprises approximately on a weight percent basis:

TABLE I

| Ingredient | Range | Weight Percent |
|---|---|---|
| Polycarbonate precursor | 15-35 | 20-25 |
| Film former or binder emulsion | 0.5-2.0 | 1.0-1.5 |
| Thickener/viscosity modifier | .02-.10 | .04-.06 |
| Dispersant | .2-2 | .5-1.0 |
| Defoamant | trace | trace |
| Catalyst (.06% by weight of the polycarbonate) | .009-.021 | 012-.015 |
| Deionized water | balance | balance |

Final solids content ranges 16 to 36 weight percent and preferrably from about 23 to 27 weight percent. The size composition is applied so as to deposit a dried coating on the fibers corresponding to about 30 weight percent on the fibers (LOI).

EXAMPLE 1

An invention coating composition prepared form the following ingredients was formulated.

TABLE II

|  | Weight Percent |
|---|---|
| Polycarbonate precursor, Lexan RMP powder from General Electric | 22.5 |
| Polox WSR-N-3333 from Union Carbide Corp. | 1.2 |
| Viscosity modifier, Drewfloc 270 from Drew Chemical Corp. | 0.05 |
| Dispersant, Triton X100 from Rohm & Haas | 0.89 |
| Defoamant, Nopco NTW from Nopco Chemical | trace |
| Catalyst, lithium salicylate | 0.014 |
| Water | balance |

The final solids content was about 25 weight percent. The coating composition is applied so as to deposit a dried coating on the fibers corresponding to about 30 weight percent of the weight of the fibers (LOI).

The film former has no effect on the polymerization rate of the Lexan ® RMP coating composition. The neutral behaving film former is especially important for use with the Lexan ® RMP material, since the use of an acid material will tend to stop the polymerization, while use of a basic material will cause premature polyermization. The aqueous coating composition listed in Table III is especially useful for coating differently sized glass rovings. According to the present invention, a flexible 30% LOI loading of Lexan ® RMP can be achieved on glass rovings.

The glass rovings formed according to the present invention are especially useful for making preforms and provide a preform with good wet out characteristics along with providing a uniform resin content in the preform. Thus, products formed according to the present invention have desirable flexibility characteristics, low powdering, high load capabilities and desirable cure characteristics. The aqueous coating composition can be applied to glass strands through either a in-line or off-line process. Typically, an in-line process is where the particular polymers are applied during the forming process of the glass wherein the powder formulation is in the aqueous coating composition applied to the forming glass fibers. In an off-line process, a strand is pulled through a dip bath then through a stripper die, through an oven to remove the excess water and then to dry or set the binder material and wound on a take-up roll.

While reference has been made to preferred formulations in accordance with the present invention, those skilled in the art may recognize that various modifications may be made, which modifications shall be within the scope of the appended claims so as to encompass all equivalent formulations, compositions and the like.

We claim:

1. An aqueous coating composition consisting essentially of, by weight percent:

|  | Weight Percent |
|---|---|
| Powdered polycarbonate precursor material comprising cyclic polycarbonate oligomers | 15-35 |
| Water soluble polymer comprising polyethylene oxide | .5-2 |
| Viscosity modifier comprising a high molecular weight, highly charged, anionic, acrylic acid polymer or copolymer | .02-.10 |
| Dispersant | .5-2.0 |
| Defoamant | 0-trace |
| Catalyst | 0.009-.021 |
| Water | balance. |

2. The coating composition of claim 1 having a final solids content ranging from 16 to 36 weight percent.

3. An aqueous coating composition consisting essentially of, by weight percent:

|  | Weight Percent |
|---|---|
| Powdered polycarbonate precursor material comprising cyclic polycarbonate oligomers | 20-25 |
| Water soluble polymer comprising polyethylene oxide | 1.0-1.5 |
| Viscosity modifier comprising a high molecular weight, highly charged, anionic, acrylic acid polymer or copolymer | .04-.06 |
| Dispersant | .5-1.0 |
| Defoamant | 0-trace |
| Catalyst | .012-.015 |
| Water | balance |

4. The coating composition of claim 1 having a final solids content ranging from 23 to 27 weight percent.

5. An aqueous coating composition consisting essentially of, by weight percent:

|  | Weight Percent |
|---|---|
| Powdered polycarbonate precursor material comprising cyclic polycarbonate oligomers | 22.5 |
| Water soluble polymer comprising polyethylene oxide | 1.2 |
| Viscosity modifier comprising a high molecular weight, highly charged, anionic, acrylic acid polymer or copolymer | 0.05 |
| Dispersant | .89 |
| Defoamant | 0-trace |
| Catalyst | .014 |
| Water | balance |

6. The coating composition of claim 5 having a final solids of about 25 weight percent.

* * * * *